United States Patent [19]
Simoncic et al.

[11] Patent Number: 5,236,070
[45] Date of Patent: Aug. 17, 1993

[54] RETRACTING STRAP PLATE CLUTCH ASSEMBLY

[75] Inventors: Bryan Simoncic; Timothy J. Throne, both of Kansas City, Mo.

[73] Assignee: Midland Brake, Inc., Kansas City, Mo.

[21] Appl. No.: 2,063

[22] Filed: Jan. 8, 1993

[51] Int. Cl.⁵ ............................................. F16D 13/50
[52] U.S. Cl. ............................. 192/70.28; 192/70.27
[58] Field of Search .............. 192/70.28, 70.27, 70.18

[56] References Cited

U.S. PATENT DOCUMENTS

| | | | |
|---|---|---|---|
| 369,404 | 10/1972 | Maucher | 192/70.18 |
| 2,026,945 | 1/1936 | Lane | 192/70.27 |
| 2,641,344 | 6/1953 | Banker | 192/70.27 X |
| 3,118,526 | 1/1964 | Wolfram | 192/68 |
| 3,283,864 | 11/1966 | Motsch | 192/70.27 X |
| 3,300,007 | 1/1967 | Motsch | 192/70.27 X |
| 4,095,683 | 6/1978 | Ban | 192/70.18 |
| 4,410,074 | 10/1983 | Maucher et al. | 192/48.7 |
| 4,450,945 | 5/1984 | Caray | 192/89 |
| 4,529,074 | 7/1985 | Alas | 192/70.12 |
| 4,635,779 | 1/1987 | Bacher et al. | 192/89 B |
| 4,650,050 | 3/1987 | Alas et al. | 192/70.12 |
| 4,681,200 | 7/1987 | Keck | 192/70.27 |
| 4,696,384 | 9/1987 | Huber | 192/70.27 |
| 5,072,816 | 12/1991 | Takeuchi et al. | 192/70.12 |
| 5,074,395 | 12/1991 | Maki et al. | 192/70.27 |
| 5,123,511 | 6/1992 | Beccaris | 192/70.13 |

FOREIGN PATENT DOCUMENTS 2546999  12/1984  France .

*Primary Examiner*—Leslie A. Braun
*Assistant Examiner*—Andrea Pitts
*Attorney, Agent, or Firm*—St. Onge Steward Johnston & Reens

[57] ABSTRACT

A retracting strap plate clutch assembly having a single annular body strap plate affixed to a clutch pressure plate has integrally preformed spring resilient tabs mounted to the clutch housing. The tabs are normally spring loaded to retract the strap plate toward the diaphragm spring so that when the clutch is released the tabs cause the pressure plate to smoothly disengage from a friction disc.

12 Claims, 3 Drawing Sheets

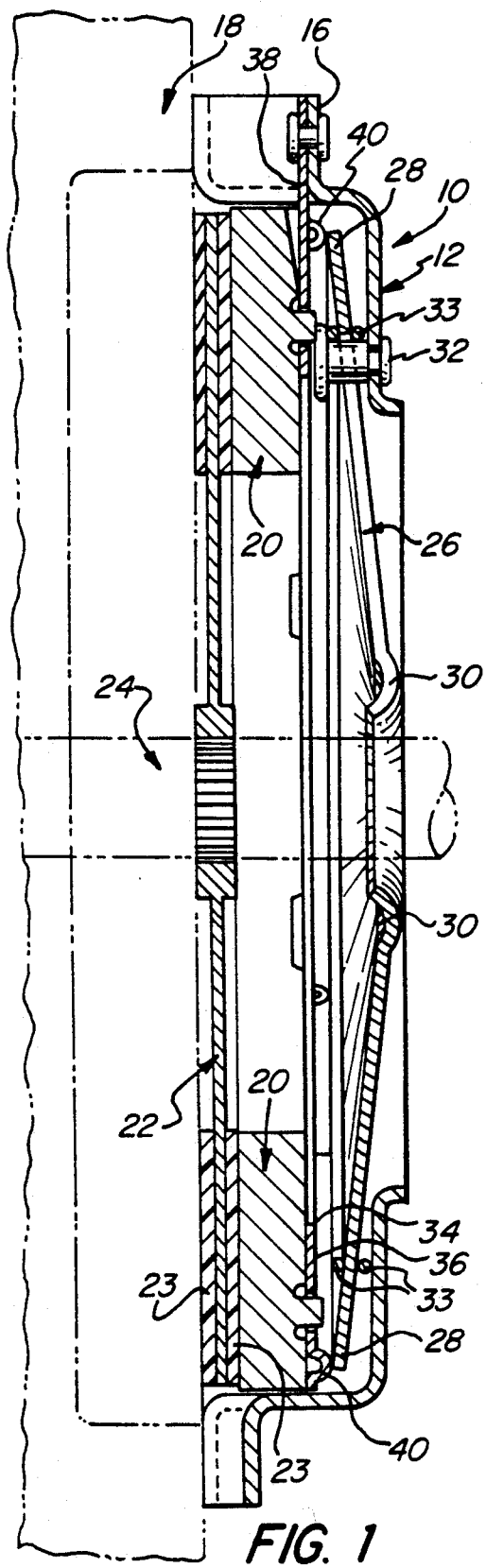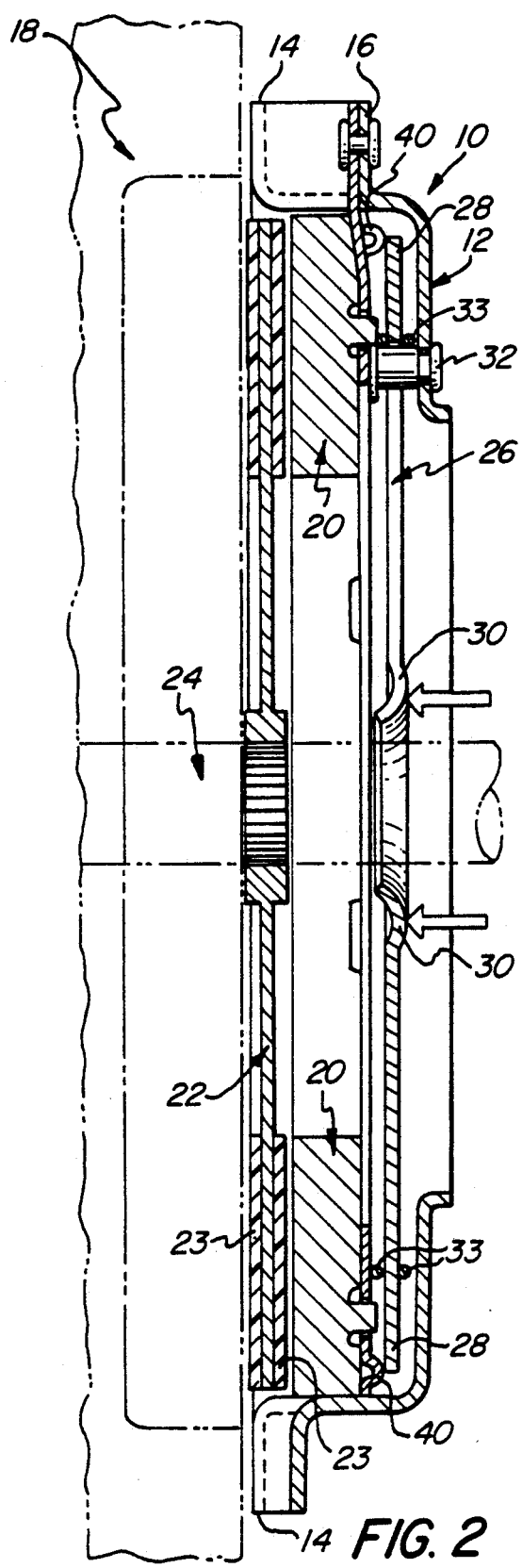

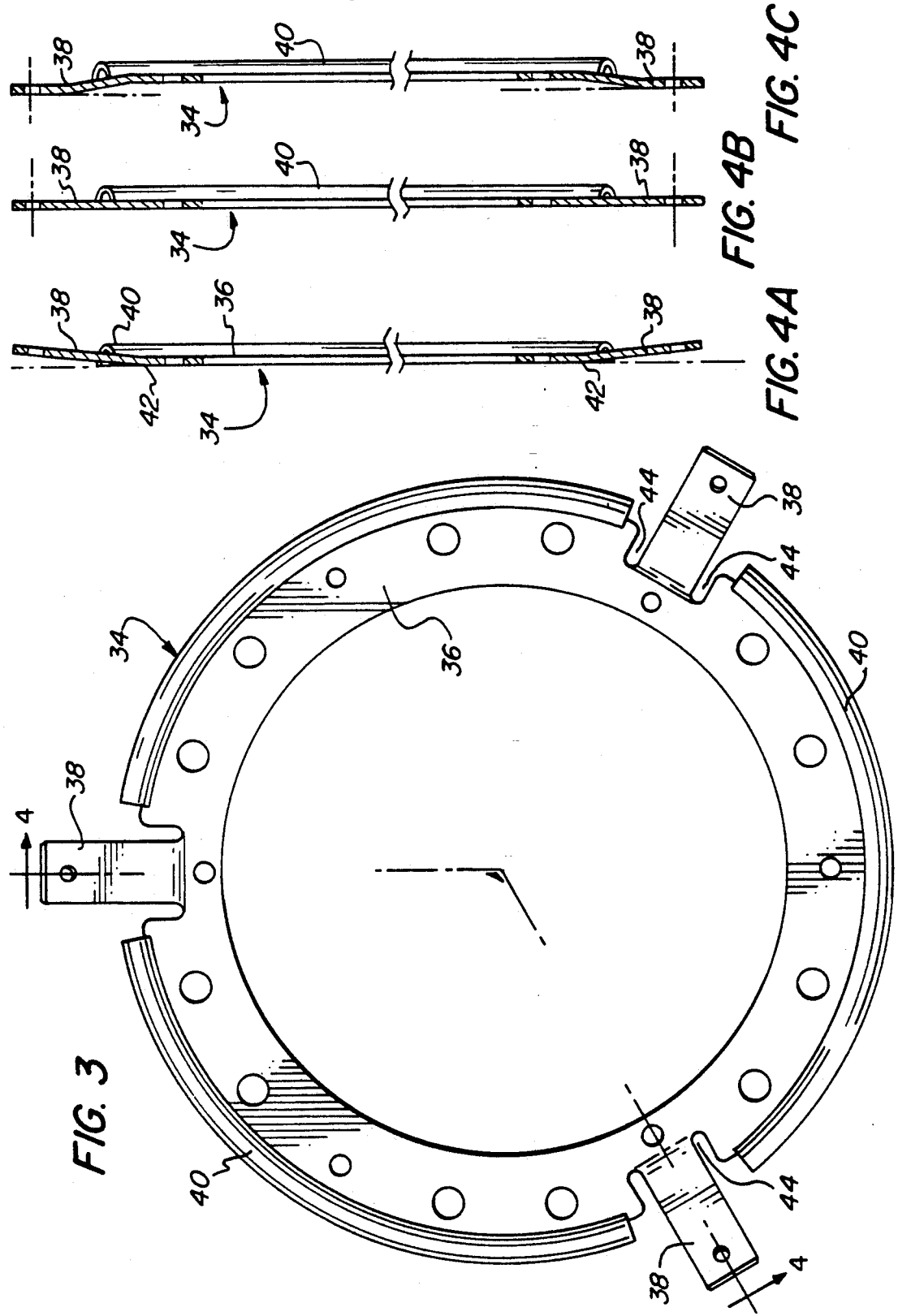

RETRACTING STRAP PLATE CLUTCH ASSEMBLY

FIELD OF THE INVENTION

The present invention relates to the field of automotive clutches for transmission of torque from a motor to an automotive transmission.

BACKGROUND OF THE INVENTION

Conventional clutches typically include a diaphragm spring that acts on a pressure plate to clamp a friction disc between a flywheel and the pressure plate. In conventional clutches, multiple metal straps or tangs are typically used to connect the pressure plate to a clutch housing which is affixed to the flywheel and which encloses the diaphragm spring, pressure plate and the friction disc. The conventional multiple tangs are shown for example in Alas, U.S. Pat. No. 4,635,779, dated Jan. 13, 1987.

SUMMARY OF THE INVENTION

It is an object of the invention to provide a clutch assembly that provides for smooth retraction and engagement of the pressure plate with a friction disc upon operation of the clutch. It is an object of the invention to provide a clutch which has advantages of ease of manufacture and improved reliability.

In accordance with one embodiment of the invention, a retracting strap plate clutch assembly comprises a housing, a pressure plate, a diaphragm spring, and a single annular body strap plate having at least two equidistant flex tabs for mounting to the housing, the strap plate being located between the pressure plate and the diaphragm spring. The pressure plate is mounted to the strap plate. The diaphragm spring has a clamping portion which bears against and operates on the strap plate.

The flex tabs have preformed bends so that the tabs normally extend axially in the direction of the diaphragm spring. However, the tabs are flexed by being mounted to the housing in a plane parallel to a plane of the annular body strap plate. This causes the tabs and the strap plate to have an axial spring resilience normally spring loaded to cause the strap plate to retract toward the diaphragm spring. Consequently, actuation of the diaphragm spring fingers to retract the peripheral clamping portion of the spring from the strap plate permits the spring loaded strap plate to smoothly retract the pressure plate from a friction disc located between the pressure plate and a flywheel. This provides a smooth disengagement of torque with minimal shuddering. The invention also provides a smooth engagement of torque when the diaphragm spring is released to engage the strap plate and pressure plate because the retracted pressure plate is held adjacent the diaphragm spring.

A stamped annular fulcrum ring for receiving the clamping portion of the diaphragm spring is preferably provided on the diaphragm spring facing side of the strap plate. Preferably, there are three equidistantly located tabs on the strap plate, and the tabs preferably have a cutaway area between the tabs and the plate to enhance resilient flexing of the tabs.

Other objects, aspects and features of the present invention in addition to those mentioned above will be pointed out in or will be understood from the following detailed description provided in conjunction with the accompanying drawings.

BRIEF DESCRIPTION OF THE DRAWINGS

FIG. 1 is a cross-sectional view of an embodiment of a retracting strap plate clutch assembly in accordance with the invention showing an engaged clutch with a friction disc clamped between a pressure plate and a flywheel.

FIG. 2 is the cross-sectional view of FIG. 1 showing a disengaged clutch with the pressure plate retracted from the friction disc.

FIG. 3 is a front elevation view of an embodiment of a single body strap plate in accordance with the invention.

FIG. 4A is a cross-sectional view of the strap plate of FIG. 3 in an unmounted position.

FIG. 4B is a cross-sectional view of the strap plate of FIG. 3 as configured in a mounted position in a clutch housing with clamping force applied by a diaphragm spring.

FIG. 4C is a cross-sectional view of the strap plate of FIG. 3 as configured in a mounted position in a clutch housing without any clamping force applied thereto.

DESCRIPTION OF THE PREFERRED EMBODIMENT

Figure 5:
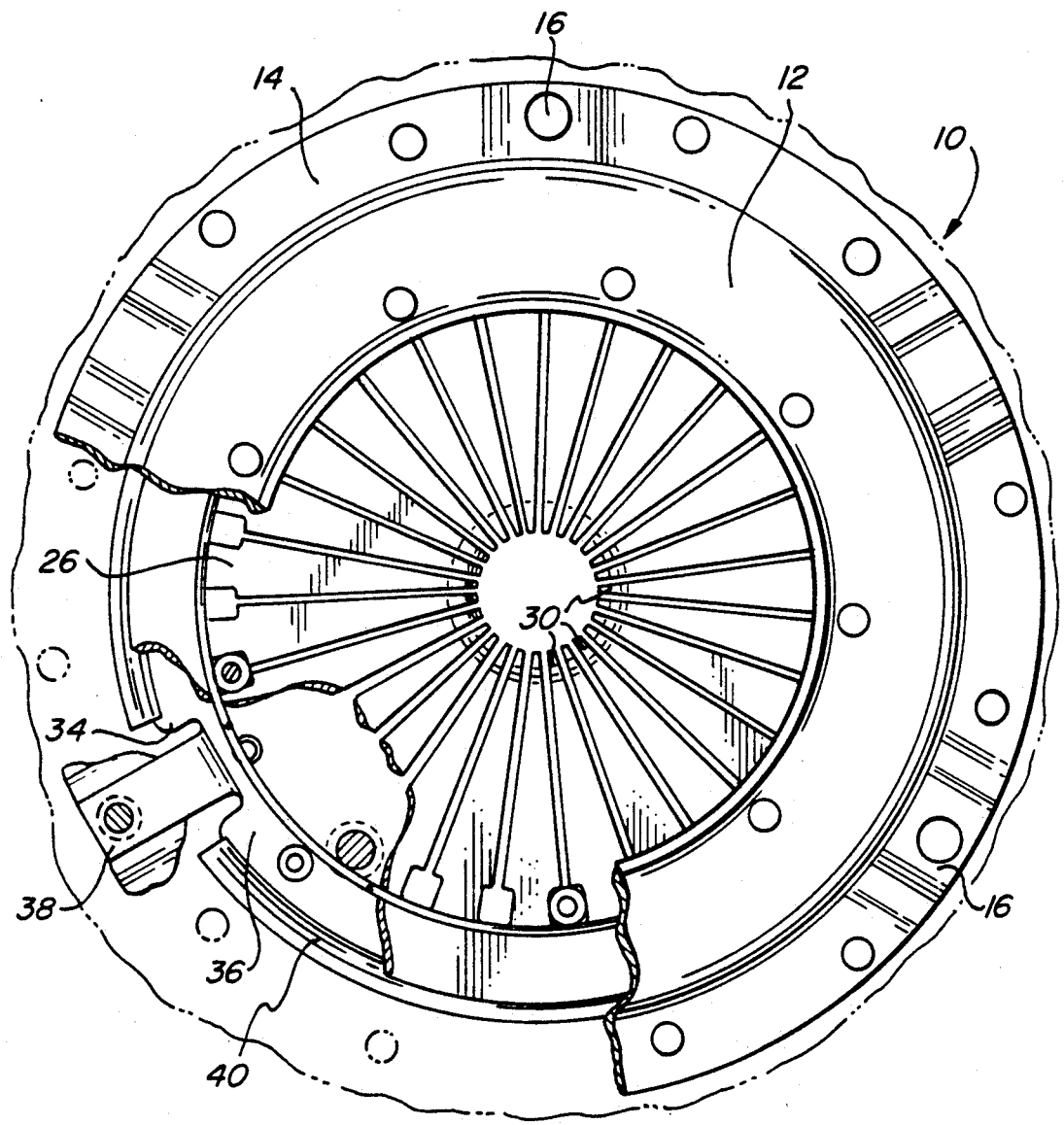
FIG. 5 is a front elevation cutaway view of an embodiment of a clutch assembly in accordance with the invention.

Referring now to FIGS. 1, 2 and 5, a retracting strap plate clutch assembly 10 is shown. Clutch assembly 10 comprises a housing 12, a pressure plate 20, a diaphragm spring 26, and a single annular body strap plate 34.

Housing 12 comprises an annular steel cover for containing the clutch components and includes an outer flange 14 with stepped flange elements 16. The stepped flange elements 16 are axially separated from the outer flange 14 and provide an anchor for the strap plate 34 as set forth hereafter. Housing 12 is to be mounted to a flywheel 18. Flywheel 18 is typically the flywheel of an automotive motor. Housing 12 can be mounted by bolts fitted through apertures provided in the flange 14 and screwed into tapped bores in flywheel 18. If desired, alignment pins may also be provided on housing 12 to fit into bores in flywheel 18.

Pressure plate 20 is retained in housing 12 by strap plate 34 as set forth hereafter. Pressure plate 20 is typically a cast metal ring suited to bear against friction disc 22 located between the pressure plate 20 and flywheel 18. Friction disc 22 has hard annular friction surfaces 23 to engage with the pressure plate 20 and flywheel 18. Friction disc 22 is typically engaged with an axle 24 for transmission of torque to the transmission or other object to be driven.

Diaphragm spring 26 is retained in housing 12 by rivets 32 and wire rings 33. Diaphragm spring 26 has a normally extended annular clamping portion 28 and a plurality of spring fingers 30 for actuation by a throwout mechanism to retract peripheral clamping portion 28 in the conventional manner.

Referring now to FIGS. 1-5, the strap plate 34 is annular in shape and comprises an annular body 36 and at least two equidistant flex tabs 38 for mounting the strap plate 34 to the housing 12 in the stepped flange elements 16. Strap plate 34 is located between the pressure plate 20 and the diaphragm spring 26. The pressure plate 20 is mounted to the strap plate 34, preferably by rivets. The strap plate 34 centers pressure plate 20 in housing 12 and connects the pressure plate 20 to flywheel 18 via housing 12 so that these components concurrently and simultaneously rotate about a central axis, such as the axis of axle 24. This permits flywheel 18, housing 12, pressure plate 20, and clamped friction disc 22 to rotate together to transmit torque from the motor to the power train through axle 24.

The diaphragm spring clamping portion 28 bears against and operates on the strap plate 34. Preferably, an annular fulcrum ring 40 is stamped in the strap plate 34 to receive the diaphragm spring clamping portion 28. The fulcrum ring 40 reduces friction load between the spring 26 and the strap plate 34 so that high clutch pedal lads are avoided. The fulcrum ring 40 also enhances the distribution of the diaphragm spring clamping force to lower unit loading and to give a more uniform clamp force applied to the pressure plate 20.

Flex tabs 38 are integrally formed with and extend radially outwardly from the strap plate 34. The flex tabs 38 have preformed bends 42 so that the tabs 38 of an unmounted strap plate 34 as seen in FIG. 4A normally extend axially in the direction of the diaphragm spring 26. However, the tabs 38 are flexed by being mated to the stepped flange element 16 of housing 12 in a plane parallel to a plane of the strap plate 34. This causes the tabs 38 and the strap plate 34 to have an axial spring resilience normally spring loaded to cause the strap plate 34 to retract toward the diaphragm spring 26.

As seen in FIG. 4B, the strap plate 34 that is mounted to the housing 12 and clamped by clamping portion 28 of the diaphragm spring 26 is substantially flat. When the clamping force is released, as shown in FIG. 4C, the tabs 38 flex to cause the body 36 of strap plate 34 to retract toward the diaphragm spring 26. Therefore, as seen in FIG. 2, actuation of the diaphragm spring 26 to retract the clamping portion 28 of the diaphragm spring 26 from the strap plate 34 permits the spring loaded strap plate 34 to smoothly retract the pressure plate 20 from the friction disc 22 located between the pressure plate 20 and the flywheel 18. This provides a smooth disengagement of torque with minimal shuddering.

The retracted strap plate 34 retains the fulcrum ring 40 generally adjacent and in contact with the clamping portion 28 of diaphragm spring 26. The contact between the retracted strap plate 34 and spring 26 provides a smooth coordinated engagement of the clutch when the diaphragm spring 26 is released to engage the clamping portion 28 of the diaphragm spring 26 with the strap plate 34 and pressure plate 20. The clutch assembly 10 therefore also provides a smooth reengagement of torque.

Preferably, there are three equidistantly located tabs 38, and the tabs preferably have a cutaway area 44 between the tabs 38 and the body 36 of the strap plate 34 to enhance resilient flexing of the tabs 38.

Therefore, the present invention provides an improved clutch assembly that features the advantages of a single body strap plate, i.e., simpler assembly, and greater reliability through the use of fewer parts. The clutch assembly as a whole has a lower weight than many prior art devices since the single body strap plate 34 permits the pressure plate 20 to be made without external lugs and bosses which are found in many prior art devices. Moreover, the lack of such lugs and bosses on the pressure plate 20 minimizes the need for extensive work to balance the clutch assembly 10, and can minimize the need to rework product components to insure proper clutch balance.

In addition to the above manufacturing efficiencies and improvements, the clutch of the present invention has improved function, namely smoother retraction of the pressure plate from the friction disc when the clutch pedal is depressed, and smoother reengagement of the pressure plate and friction disc when the clutch pedal is released.

It is to be appreciated that the foregoing is illustrative and not limiting of the invention, and that various changes and modifications to the preferred embodiments described above will be apparent to those skilled in the art. Such changes and modifications can be made without departing from the spirit and scope of the present invention, and it is therefore intended that such changes and modifications be covered by the following claims.

What is claimed is:

1. In a clutch assembly for transmission of torque having a housing containing a diaphragm spring for applying a spring load to a pressure plate, said housing being retained to a flywheel with at least one friction disc located between said flywheel and said pressure plate wherein said spring normally causes said pressure plate to clamp said friction disc against said flywheel to engage transmission of torque from said flywheel to said friction disc, and wherein said diaphragm spring can be actuated to release the clamping force of said pressure plate against said friction disc and flywheel to disengage transmission of torque from said flywheel to said friction disc;

a single strap plate having at least two integrally preformed tabs extending radially outwardly from said strap plate, said tabs being mounted to said housing and being axially bent to provide said strap plate with an axial spring resilience normally spring loaded to cause said strap plate to retract away from said flywheel; said strap plate being affixed to said pressure plate to center said pressure plate in said housing and connect said housing and pressure plate whereby said flywheel and pressure plate may concurrently and simultaneously be rotated about a central axis, said strap plate being located between said pressure plate and said diaphragm spring whereby actuation of said diaphragm spring to release clamping force from said strap plate and pressure plate permits said tabs of said spring loaded strap plate to smoothly retract said pressure plate from said friction disc to smoothly disengage transmission of torque from said flywheel to said friction disc with minimal shuddering, said retracted strap plate and retained pressure plate providing a resilient and smooth engagement with said friction disc when said diaphragm spring is released to engage the clamping force of said pressure plate on said friction disc.

2. A clutch assembly in accordance with claim 1, said single strap plate further comprising a cutaway area between said tabs and said plate to enhance resilient flexing of said tabs.

3. A clutch assembly in accordance with claim 1, wherein said strap plate further comprises a stamped annular fulcrum ring for receiving an operative outer perimeter of said diaphragm spring to provide the diaphragm spring clamping force to said strap plate and pressure plate.

4. A clutch assembly in accordance with claim 1, wherein said single strap plate comprises three equidistantly located tabs.

5. In a clutch assembly for transmission of torque having a housing containing a diaphragm spring for applying a spring load to an annular pressure plate, said housing being retained to a flywheel with at least one friction disc located between said flywheel and said pressure plate wherein said spring normally causes said pressure plate to clamp said friction disc against said flywheel to engage transmission of torque from said flywheel to said friction disc, and wherein said diaphragm spring can be actuated to release the clamping force of said pressure plate against said friction disc and flywheel to disengage transmission of torque from said flywheel to said friction disc;

a single strap plate having an annular body with a diaphragm spring receiving face, and having at least two equidistantly spaced integrally preformed flex tabs extending radially outwardly from a perimeter of said body of said strap plate, a bend being formed in each said tab whereby said tabs normally extend axially in the direction of said spring receiving face, said tabs being mounted to said housing in a fixed plane parallel to said annular body, whereby said tabs are therefore normally spring loaded to cause said strap plate to retract axially in the direction of said spring receiving face;

a strap plate face opposite said spring receiving face being affixed to said pressure plate to center said pressure plate in said housing and connect said housing and pressure plate whereby said flywheel and pressure plate may concurrently and simultaneously be rotated about a central axis; said spring receiving face receiving an operative portion of said diaphragm spring to normally provide the diaphragm spring clamping force to said strap plate and pressure plate, whereby actuation of said diaphragm spring to release clamping force from said strap plate and pressure plate permits said tabs of said spring loaded strap plate to smoothly retract said pressure plate from said friction disc to smoothly disengage transmission of torque from said flywheel to said friction disc, said retracted strap plate and retained pressure plate providing a resilient and smooth engagement with said friction disc when said diaphragm spring is released to engage the clamping force of said pressure plate on said friction disc.

6. A clutch assembly in accordance with claim 5, wherein said strap plate further comprises a stamped annular fulcrum ring for receiving an operative outer perimeter of said diaphragm spring to provide the diaphragm spring clamping force to said strap plate and pressure plate.

7. A clutch assembly in accordance with claim 5, wherein said tabs are surrounded by a cutaway area between said tabs and said plate to enhance resilient flexing of said tabs.

8. A clutch assembly in accordance with claim 5, wherein said single strap plate comprises three equidistantly located tabs.

9. A retracting strap plate clutch assembly for transmission of torque from a flywheel, comprising:

a housing;

a pressure plate retained in said housing;

a diaphragm spring retained in said housing, said diaphragm spring having a normally extended annular clamping portion and a plurality of spring fingers for actuation to retract said clamping portion;

a single annular body strap plate located between said pressure plate and said diaphragm spring, said pressure plate being affixed to said strap plate and said clamping portion of said diaphragm spring being engageable with and operative upon said strap plate to normally clamp said strap plate and pressure plate, said strap plate having at least two integrally formed tabs extending radially outwardly from a perimeter of said strap plate, said tabs having bends formed therein such that said tabs normally extend axially in the direction of said diaphragm spring, said tabs being mounted to said housing in stepped flange elements of said housing in a plane parallel to a plane of said annular body strap plate, whereby said strap plate is provided with an axial spring resilience normally spring loaded to cause said strap plate to retract toward said diaphragm spring; whereby actuation of said spring fingers to retract said clamping portion releases clamping force from said diaphragm spring on said strap plate and pressure plate and thereby permits said tabs of said spring loaded strap plate to smoothly retract said pressure plate.

10. A retracting strap plate clutch assembly in accordance with claim 9, wherein said strap plate further comprises a stamped annular fulcrum ring for receiving said clamping portion of said diaphragm spring.

11. A retracting strap plate clutch assembly in accordance with claim 10, wherein said single strap plate comprises three equidistantly located tabs.

12. A retracting strap plate clutch assembly in accordance with claim 11, said strap plate further comprising a cutaway area between said tabs and said plate to enhance resilient flexing of said tabs.

* * * * *